US012693901B2

(12) United States Patent (10) Patent No.: US 12,693,901 B2

Maddi et al. (45) Date of Patent: Jul. 28, 2026

(54) AUTOMATICALLY PROCESSING BATCH JOBS IN CLOUD ENVIRONMENTS USING ARTIFICIAL INTELLIGENCE TECHNIQUES

(71) Applicant: Dell Products L.P., Round Rock, TX (US)

(72) Inventors: Divya Maddi, Round Rock, TX (US); Bijan Kumar Mohanty, Austin, TX (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 817 days.

(21) Appl. No.: 18/107,296

(22) Filed: Feb. 8, 2023

(65) Prior Publication Data

US 2024/0264868 A1 Aug. 8, 2024

(51) Int. Cl.
G06F 9/50 (2006.01)
G06N 3/02 (2006.01)

(52) U.S. Cl.
CPC ............. G06F 9/5027 (2013.01); G06N 3/02 (2013.01)

(58) Field of Classification Search
None
See application file for complete search history.

(56) References Cited

U.S. PATENT DOCUMENTS

| | | | | | |
|---|---|---|---|---|---|
| 11,080,601 | B2 * | 8/2021 | Lyske | ...................... | G06N 3/09 |
| 11,082,387 | B1 * | 8/2021 | Vukich | .................. | G06N 3/045 |
| 12,547,886 | B2 * | 2/2026 | Upadhyay | ................ | G06N 3/08 |
| 12,566,643 | B2 * | 3/2026 | Mohanty | ............... | G06F 9/5083 |
| 2015/0277987 | A1 * | 10/2015 | Di Balsamo | .......... | G06F 9/5083 |
| | | | | | 718/104 |
| 2016/0098292 | A1 * | 4/2016 | Boutin | .................. | G06F 9/4881 |
| | | | | | 718/104 |

(Continued)

OTHER PUBLICATIONS

Mustafa et al.; "A Machine Learning Approach for Predicting Execution Time of Spark Jobs"; Alexandria Engineering Journal (2018); https://doi.org/10.1016/j.aej.2018.03.006; (Mustafa_2018. pdf) (Year: 2018).*

(Continued)

*Primary Examiner* — Hiren P Patel

(74) *Attorney, Agent, or Firm* — Ryan, Mason & Lewis, LLP

(57) ABSTRACT

Methods, apparatus, and processor-readable storage media for automatically processing batch jobs in cloud environments using artificial intelligence techniques are provided herein. An example computer-implemented method includes obtaining historical job execution-related data for previous batch jobs in at least one cloud environment and resource utilization-related data for one or more pending batch jobs in the at least one cloud environment; predicting execution outcome(s) for the pending batch job(s) by processing at least a portion of the historical job execution-related data and at least a portion of the resource utilization-related data using artificial intelligence techniques; estimating temporal duration(s) associated with executing the pending batch job(s) by processing the at least a portion of the historical job execution-related data and the at least a portion of the resource utilization-related data using the artificial intelligence techniques; and performing automated actions based on the predicted execution outcome(s) and the estimated temporal duration(s).

18 Claims, 8 Drawing Sheets

```
                                           ┌ 1000
┌─────────────────────────────────────────────┐
│ OBTAIN HISTORICAL JOB EXECUTION-RELATED DATA │
│ FOR ONE OR MORE PREVIOUS BATCH JOBS IN AT    │
│ LEAST ONE CLOUD ENVIRONMENT AND RESOURCE     │
│ UTILIZATION-RELATED DATA FOR ONE OR MORE     │
│ PENDING BATCH JOBS IN THE AT LEAST ONE       │
│ CLOUD ENVIRONMENT                            │
└─────────────────────────────────────────────┘
                      │
                      ▼                    ┌ 1002
┌─────────────────────────────────────────────┐
│ PREDICT ONE OR MORE EXECUTION OUTCOMES FOR   │
│ THE ONE OR MORE PENDING BATCH JOBS IN THE AT │
│ LEAST ONE CLOUD ENVIRONMENT BY PROCESSING AT │
│ LEAST A PORTION OF THE HISTORICAL JOB        │
│ EXECUTION-RELATED DATA AND AT LEAST A        │
│ PORTION OF THE RESOURCE UTILIZATION-RELATED  │
│ DATA USING ONE OR MORE ARTIFICIAL            │
│ INTELLIGENCE TECHNIQUES                      │
└─────────────────────────────────────────────┘
                      │
                      ▼                    ┌ 1004
┌─────────────────────────────────────────────┐
│ ESTIMATE ONE OR MORE TEMPORAL DURATIONS      │
│ ASSOCIATED WITH EXECUTING THE ONE OR MORE    │
│ PENDING BATCH JOBS IN THE AT LEAST ONE CLOUD │
│ ENVIRONMENT BY PROCESSING THE AT LEAST A     │
│ PORTION OF THE HISTORICAL JOB EXECUTION-     │
│ RELATED DATA AND THE AT LEAST A PORTION OF   │
│ THE RESOURCE UTILIZATION-RELATED DATA USING  │
│ THE ONE OR MORE ARTIFICIAL INTELLIGENCE      │
│ TECHNIQUES                                   │
└─────────────────────────────────────────────┘
                      │
                      ▼                    ┌ 1006
┌─────────────────────────────────────────────┐
│ PERFORM ONE OR MORE AUTOMATED ACTIONS BASED  │
│ AT LEAST IN PART ON THE ONE OR MORE          │
│ PREDICTED EXECUTION OUTCOMES AND THE ONE OR  │
│ MORE ESTIMATED TEMPORAL DURATIONS            │
└─────────────────────────────────────────────┘
```

(56) References Cited

U.S. PATENT DOCUMENTS

| | | | | |
|---|---|---|---|---|
| 2017/0357892 | A1* | 12/2017 | Lin | G06N 3/084 |
| 2018/0060402 | A1* | 3/2018 | Fabjanski | G06F 16/22 |
| 2019/0114774 | A1* | 4/2019 | Zhang | G06T 7/11 |
| 2020/0004863 | A1* | 1/2020 | Kumar | G06N 7/01 |
| 2020/0264927 | A1* | 8/2020 | Saha | G06N 5/04 |
| 2020/0334089 | A1* | 10/2020 | Ramanathan | G06F 9/45558 |
| 2021/0034374 | A1* | 2/2021 | Saxena | G06Q 30/0206 |
| 2021/0044496 | A1* | 2/2021 | Snyder | H04L 47/821 |
| 2022/0187847 | A1* | 6/2022 | Cella | G05B 19/41885 |
| 2022/0207285 | A1* | 6/2022 | Niehaus | G06N 3/098 |
| 2022/0326999 | A1* | 10/2022 | Penney | G06F 9/5027 |
| 2023/0018199 | A1* | 1/2023 | Mahamuni | G06F 11/3051 |
| 2023/0032486 | A1* | 2/2023 | Chan | G06T 12/00 |
| 2024/0160494 | A1* | 5/2024 | Habbanakuppe Surendranath | G06N 3/08 |

OTHER PUBLICATIONS

Pham et al.; "Predicting Workflow Task Execution Time in the Cloud Using a Two-Stage Machine Learning Approach"; IEEE, Transactions on Cloud Computing, vol. 8, No. 1, 2020; DOI: 10.1109/TCC.2017.2732344; (Pham_2017.pdf) (Year: 2017).*

Salesforce.com, Object Reference for Salesforce and Lightning Platform, Apex Trigger Event Type, https://developer.salesforce.com/docs/atlas.en-us.224.0.object_reference.meta/object_reference/sforce_api_objects_eventlogfile_apextrigger.htm, Jul. 2, 2020.

Amazon, Amazon Cloud Watch, Getting statistics for a specific resource, https://docs.aws.amazon.com/AmazonCloudWatch/latest/monitoring/US_SingleMetricPerInstance.html, Jan. 23, 2023.

* cited by examiner

Figure 1:
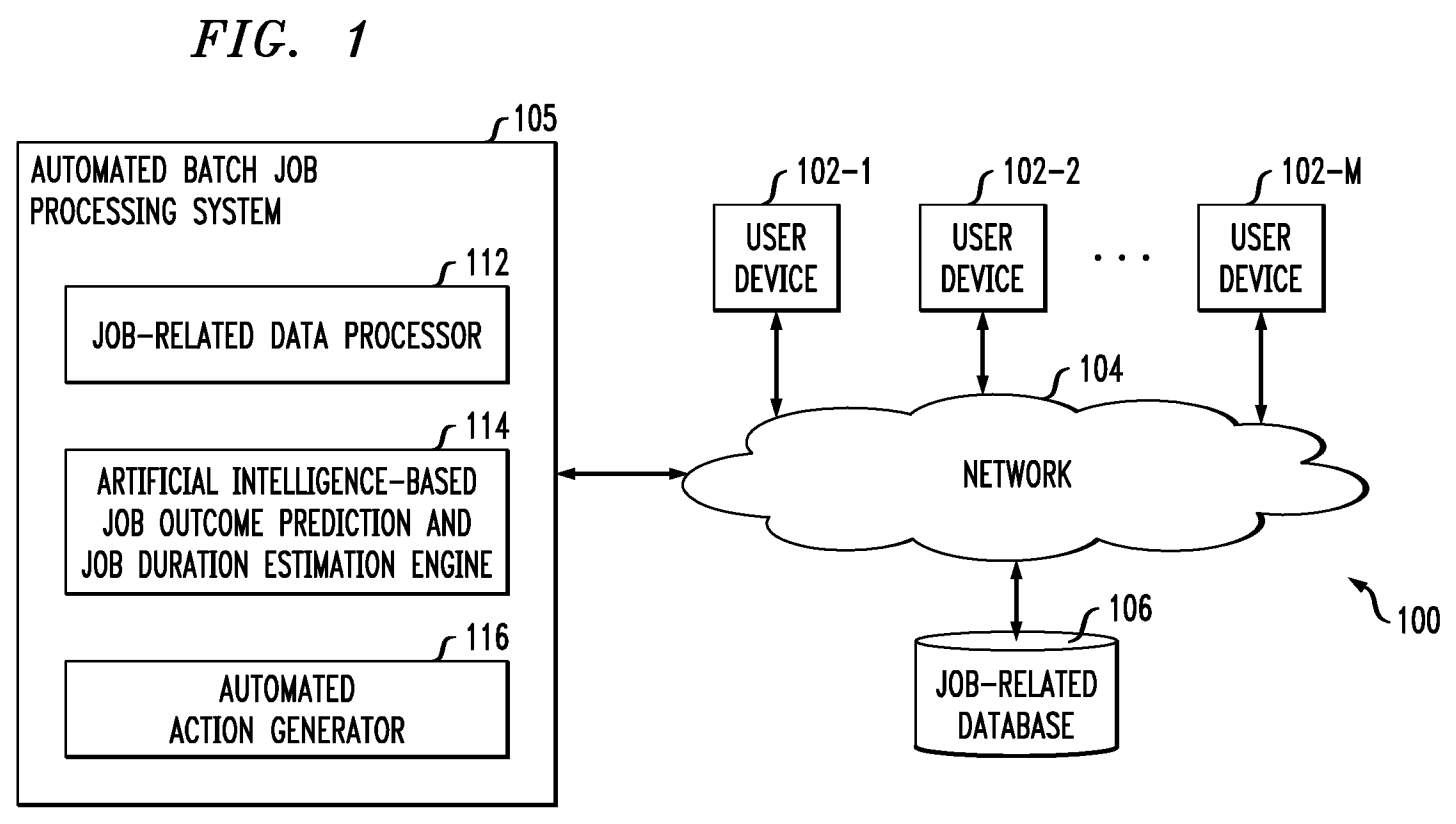

NETWORK 102-1
USER
DEVICE 102-2
USER
DEVICE

102-M
USER
DEVICE

106
JOB-RELATED
DATABASE

105
AUTOMATED BATCH JOB
PROCESSING SYSTEM

112
JOB-RELATED DATA PROCESSOR

114
ARTIFICIAL INTELLIGENCE-BASED
JOB OUTCOME PREDICTION AND
JOB DURATION ESTIMATION ENGINE

116
AUTOMATED
ACTION GENERATOR

*FIG. 4*

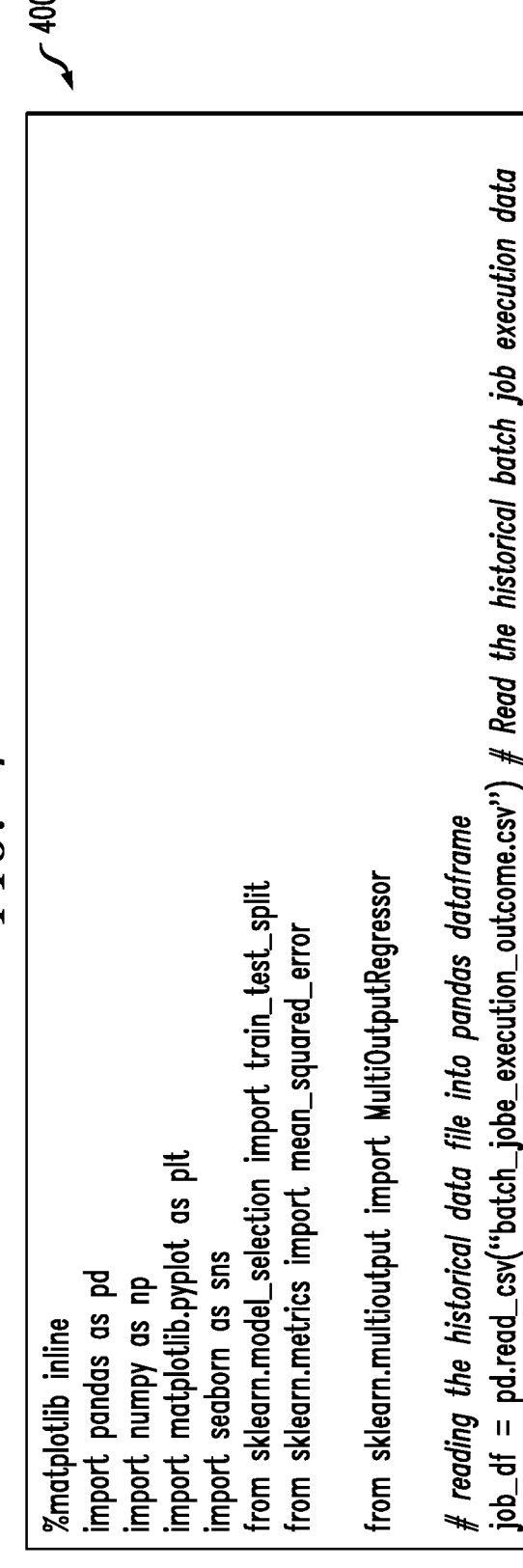

400

```
%matplotlib inline
import pandas as pd
import numpy as np
import matplotlib.pyplot as plt
import seaborn as sns
from sklearn.model_selection import train_test_split
from sklearn.metrics import mean_squared_error from sklearn.multioutput import MultiOutputRegressor reading the historical data file into pandas dataframe
job_df = pd.read_csv("batch_jobe_execution_outcome.csv")  # Read the historical batch job execution data
```

*FIG. 5*

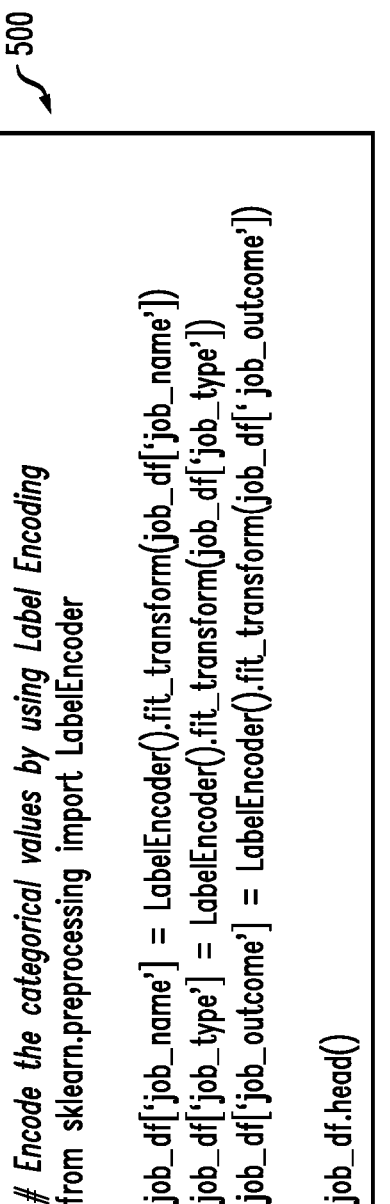

500

```
# Encode the categorical values by using Label Encoding
from sklearn.preprocessing import LabelEncoder job_df['job_name'] = LabelEncoder().fit_transform(job_df['job_name'])
job_df['job_type'] = LabelEncoder().fit_transform(job_df['job_type'])
job_df['job_outcome'] = LabelEncoder().fit_transform(job_df['job_outcome'])

job_df.head()
```

```
# Split Train and Test data sets
#First get the independent variables and dependent variable separated
features = [col for col in job_df.columns if col != 'job_outcome' and col != 'job_duration']

X_train, X_test, y_train, y_test = train_test_split(job_df[features], job_df[['job_outcome', 'job_duration']],
                                                     test_size=.3, random_state=42)
```

```
Using Tensorflow Keras to create the Dense Neural Network model for multi-output classification & regression import tensorflow.keras as keras
from tensorflow.keras.layers import Dense input_layer = keras.Input(shape=12, name="input_layer")

dense_1 = keras.layers.Dense(12, name = 'dense_1')(input_layer)
dense_2 = keras.layers.Dense(12, name = 'dense_2')(dense_1)

classification_output = keras.layers.Dense(1, activation = 'sigmoid', name = 'classification_output')(dense_2)
regression_output = keras.layers.Dense(1, activation = 'linear', name = 'regression_output')(dense_2)

model = keras.Model(inputs=input_layer,outputs=[classification_output, regression_output])
```

800

```
model.compile(
optimizer="adam",
loss=[
    keras.losses.binary_crossentropy(),
    keras.losses.MeanSquaredError(),
])

model.fit(X_train,
{"classification_output": y_train['job_outcome'], "regression_output": y_train['job_duration']},
epochs=200,
batch_size=50,
verbose=1)
```

900

```
predictions = model.predict([[row]])

print(predictions[0])
print(predictions[1])
```

Figure 10:
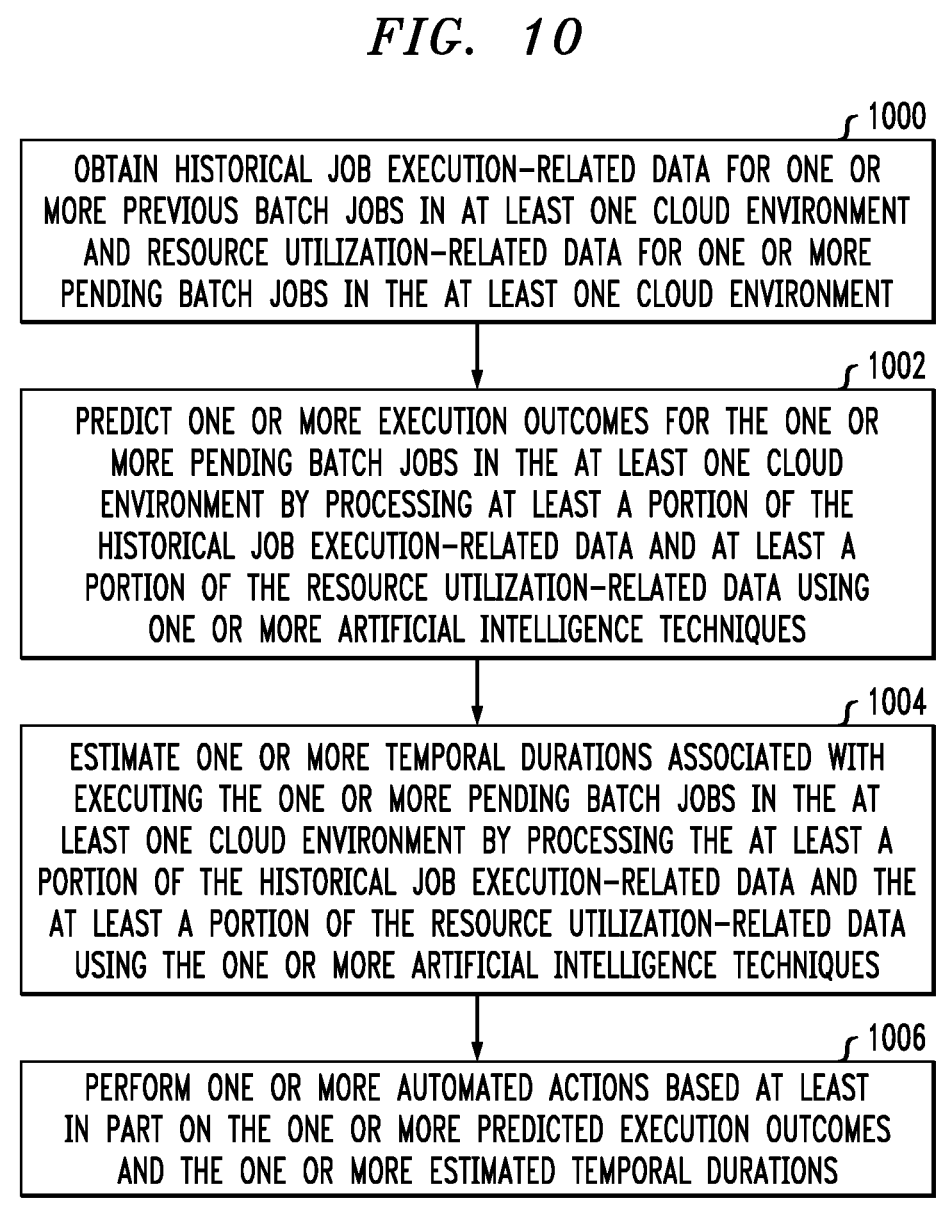

OBTAIN HISTORICAL JOB EXECUTION-RELATED DATA FOR ONE OR MORE PREVIOUS BATCH JOBS IN AT LEAST ONE CLOUD ENVIRONMENT AND RESOURCE UTILIZATION-RELATED DATA FOR ONE OR MORE PENDING BATCH JOBS IN THE AT LEAST ONE CLOUD ENVIRONMENT

1002

PREDICT ONE OR MORE EXECUTION OUTCOMES FOR THE ONE OR MORE PENDING BATCH JOBS IN THE AT LEAST ONE CLOUD ENVIRONMENT BY PROCESSING AT LEAST A PORTION OF THE HISTORICAL JOB EXECUTION-RELATED DATA AND AT LEAST A PORTION OF THE RESOURCE UTILIZATION-RELATED DATA USING ONE OR MORE ARTIFICIAL INTELLIGENCE TECHNIQUES

1004

ESTIMATE ONE OR MORE TEMPORAL DURATIONS ASSOCIATED WITH EXECUTING THE ONE OR MORE PENDING BATCH JOBS IN THE AT LEAST ONE CLOUD ENVIRONMENT BY PROCESSING THE AT LEAST A PORTION OF THE HISTORICAL JOB EXECUTION-RELATED DATA AND THE AT LEAST A PORTION OF THE RESOURCE UTILIZATION-RELATED DATA USING THE ONE OR MORE ARTIFICIAL INTELLIGENCE TECHNIQUES

1006

PERFORM ONE OR MORE AUTOMATED ACTIONS BASED AT LEAST IN PART ON THE ONE OR MORE PREDICTED EXECUTION OUTCOMES AND THE ONE OR MORE ESTIMATED TEMPORAL DURATIONS

AUTOMATICALLY PROCESSING BATCH JOBS IN CLOUD ENVIRONMENTS USING ARTIFICIAL INTELLIGENCE TECHNIQUES

COPYRIGHT NOTICE

FIELD

The field relates generally to information processing systems, and more particularly to techniques for resource management in such systems.

BACKGROUND

Hosting applications on cloud environments has become increasingly common in enterprises and other organizations. Also, many such instances include using multi-tenant hosting with shared underlying infrastructure (e.g., to reduce costs, etc.). However, using conventional application management techniques, sharing resources in multi-tenant hosting contexts often imposes resource limitations, resulting in application performance reductions.

SUMMARY

Illustrative embodiments of the disclosure provide techniques for automatically processing batch jobs in cloud environments using artificial intelligence techniques.

An exemplary computer-implemented method includes obtaining historical job execution-related data for one or more previous batch jobs in at least one cloud environment and resource utilization-related data for one or more pending batch jobs in the at least one cloud environment. The method also includes predicting one or more execution outcomes for the one or more pending batch jobs in the at least one cloud environment by processing at least a portion of the historical job execution-related data and at least a portion of the resource utilization-related data using one or more artificial intelligence techniques. Additionally, the method includes estimating one or more temporal durations associated with executing the one or more pending batch jobs in the at least one cloud environment by processing the at least a portion of the historical job execution-related data and the at least a portion of the resource utilization-related data using the one or more artificial intelligence techniques. Further, the method includes performing one or more automated actions based at least in part on the one or more predicted execution outcomes and the one or more estimated temporal durations.

Illustrative embodiments can provide significant advantages relative to conventional application management techniques. For example, problems associated with application performance reductions are overcome in one or more embodiments through predicting execution outcomes and runtime durations for one or more batch jobs using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 1 shows an information processing system configured for automatically processing batch jobs in cloud environments using artificial intelligence techniques in an illustrative embodiment.

FIG. 4 shows example pseudocode for data preprocessing in an illustrative embodiment.

FIG. 5 shows example pseudocode for encoding categorical values in an illustrative embodiment.

FIG. 6 shows example pseudocode for splitting a dataset into training and testing sets in an illustrative embodiment.

FIG. 7 shows example pseudocode for creating a neural network in an illustrative embodiment.

FIG. 10 is a flow diagram of a process for automatically processing batch jobs in cloud environments using artificial intelligence techniques in an illustrative embodiment.

DETAILED DESCRIPTION

Figure 2:
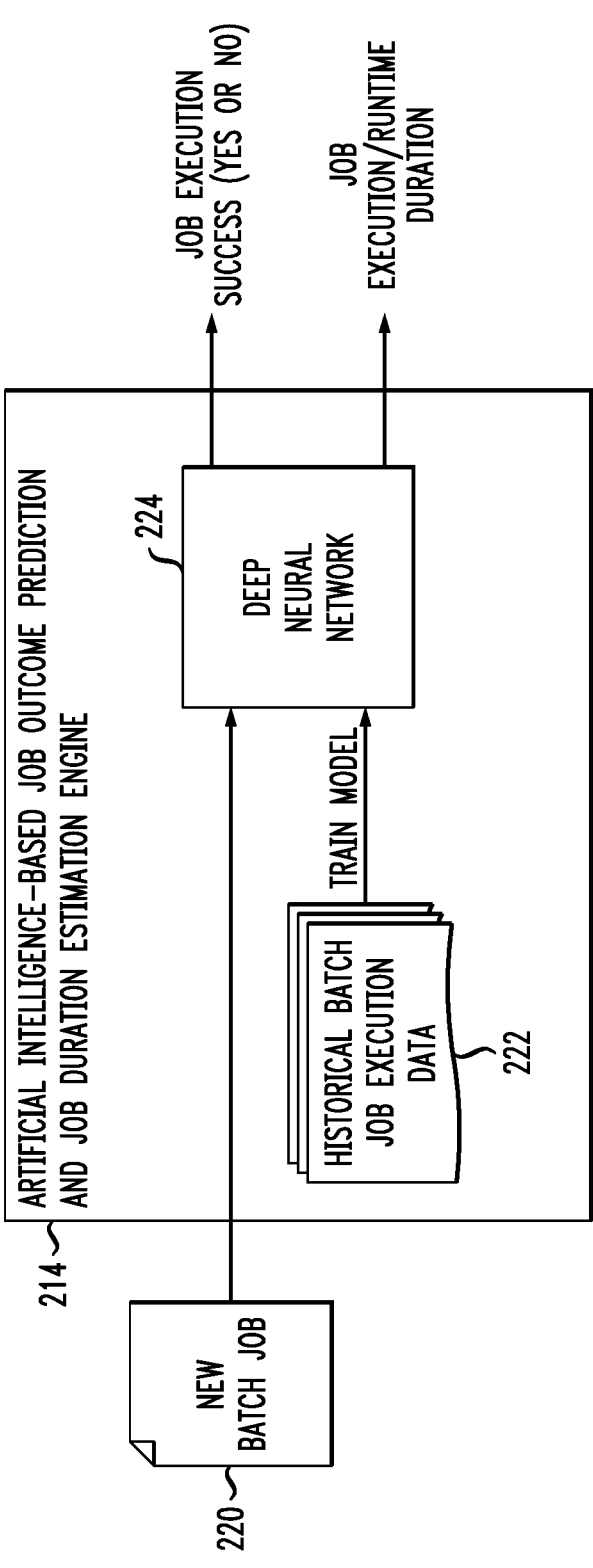
FIG. 2 shows example architecture of an artificial intelligence-based job outcome prediction and job duration estimation engine in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated batch job processing system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated batch job processing system 105 can have an associated job-related database 106 configured to store data pertaining to historical outcome-related data for various jobs, resource utilization data associated with various jobs, processing time data for one or more types of jobs, etc.

The job-related database 106 in the present embodiment is implemented using one or more storage systems associated with automated batch job processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated batch job processing system 105 are one or more input-output devices, which illustratively comprise keyboards, displays or other types of input-output devices in any combination. Such input-output devices can be used, for example, to support one or more user interfaces to automated batch job processing system 105, as well as to support communication between automated batch job processing system 105 and other related systems and devices not explicitly shown.

Additionally, automated batch job processing system 105 in the FIG. 1 embodiment is assumed to be implemented using at least one processing device. Each such processing device generally comprises at least one processor and an associated memory, and implements one or more functional modules for controlling certain features of automated batch job processing system 105.

More particularly, automated batch job processing system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated batch job processing system 105 to communicate over the network 104 with the user devices 102, and illustratively comprises one or more conventional transceivers.

The automated batch job processing system 105 further comprises job-related data processor 112, artificial intelligence-based job outcome prediction and job duration estimation engine 114, and automated action generator 116.

It is to be appreciated that this particular arrangement of elements 112, 114 and 116 illustrated in the automated batch job processing system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically scheduling batch jobs in cloud environments using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated batch job processing system 105 and job-related database 106 can be on and/or part of the same processing platform.

An exemplary process utilizing elements 112, 114 and 116 of an example automated batch job processing system 105 in computer network 100 will be described in more detail with reference to the flow diagram of FIG. 10.

Accordingly, at least one embodiment includes generating and/or implementing a scheduling framework for batch jobs in cloud environments. By way merely of example, batch jobs include jobs that typically require non-trivial amounts of time to execute (which can tie-up and/or restrict resources) such as, e.g., weekly or monthly reports, extract, transform and load (ETL) jobs, data dump jobs, etc. Also, such an embodiment includes predicting one or more outcomes of executing at least one batch job in a given cloud environment with at least one estimated time to take (that is, estimated time required to execute) at any point of time by using a multi-target classification and/or regression approach from batch job execution history on the given cloud environment. Considering that the volume of transactions on a cloud environment is not fixed, but can vary, for example across hours of the day, days of the week, etc., the time to run a specific long-running batch job can also vary depending on what day and time it is being planned to run.

By leveraging at least one artificial intelligence-based multi-class algorithm and training such an algorithm using historical utilization data of each batch job associated with the given cloud environment, along with the resource state (e.g., the state of utilization of infrastructure resources such as compute, memory, storage, input-output (IO), etc.), such an embodiment can include predicting one or more outcomes for executing a given batch job on the given cloud environment and estimating an amount of time associated with executing the given batch job. As further detailed herein, such artificial intelligence-based scheduling of batch jobs (e.g., long running, large batch jobs) can improve the performance of the overall cloud environment as well as related resource utilization.

In at least one embodiment, predicting outcomes and running times associated with completing batch jobs in a given cloud environment can facilitate making decisions in connection with scheduling and executing particular jobs (e.g., decisions which can reduce and/or prevent detrimental effects on the cloud environment). To achieve predictions and estimations on batch jobs, such an embodiment includes leveraging historical outcomes, resource utilization data and processing time data of one or more types of jobs, as well as hosting environment behavior data (e.g., infrastructure metrics related, for example, to CPU data, memory data, storage utilization data, etc.) as captured via one or more logging systems. Such data, at least portions of which can include timestamp information, can capture information pertaining to load, volume, and/or seasonality. As also detailed herein, such data can be processed using at least one machine learning algorithm such as, for example, a multi-target algorithm capable of outcome prediction (e.g., using a classifier) and time estimation (e.g., using a regressor).

In one or more embodiments, estimating the time duration of execution of one or more jobs from a set of input data that include, for example, date and/or time information, job name(s), infrastructure utilization information (e.g., CPU information, memory information, IO information, storage information, etc.), as well as host infrastructure availability information. In such an embodiment, at least two target labels are generated, wherein such labels can include a job execution outcome label (e.g., success or failure) and a run-time duration of the batch job label.

Once such input data are obtained and/or collected, data engineering and/or data analysis can be carried out to identify one or more features that can influence the target variables (e.g., the execution outcome of the batch job and the estimated run time of the batch job). In one or more embodiments, such a step can also include identifying one or more unnecessary features that are correlated, which helps in removing such features to reduce data dimensionality and model complexity as well as improving the performance and accuracy of the model.

As further detailed herein (e.g., in connection with FIG. 2), as one or more embodiments include performing multi-target predictions and estimations simultaneously, such an embodiment includes leveraging at least one deep neural network that has two parallel branches, with one branch acting as a classifier (e.g., for predicting the job execution outcome) and one branch acting as a regressor (e.g., for estimating the run time duration of the job).

FIG. 2 shows example architecture of an artificial intelligence-based job outcome prediction and job duration estimation engine in an illustrative embodiment. By way of illustration, FIG. 2 depicts a new batch job 220 processed by artificial intelligence-based job outcome prediction and job duration estimation engine 214. More specifically, artificial intelligence-based job outcome prediction and job duration estimation engine 214 includes deep neural network 224, a multi-output neural network that includes two parallel branches of network for two types of outputs. By way of example, deep neural network 224 can process the same set of input data as a single input layer and implement a dense, multi-layer neural network to act as a classifier as well as a regressor for multi-output predictions.

As also depicted in FIG. 2, historical batch job execution data 222 are used to train deep neural network 224, which processes data pertaining to the new batch job 220 to generate a job execution success prediction (namely, a yes (successful) or no (not successful) prediction) and a job execution and/or runtime duration estimation.

Figure 3:
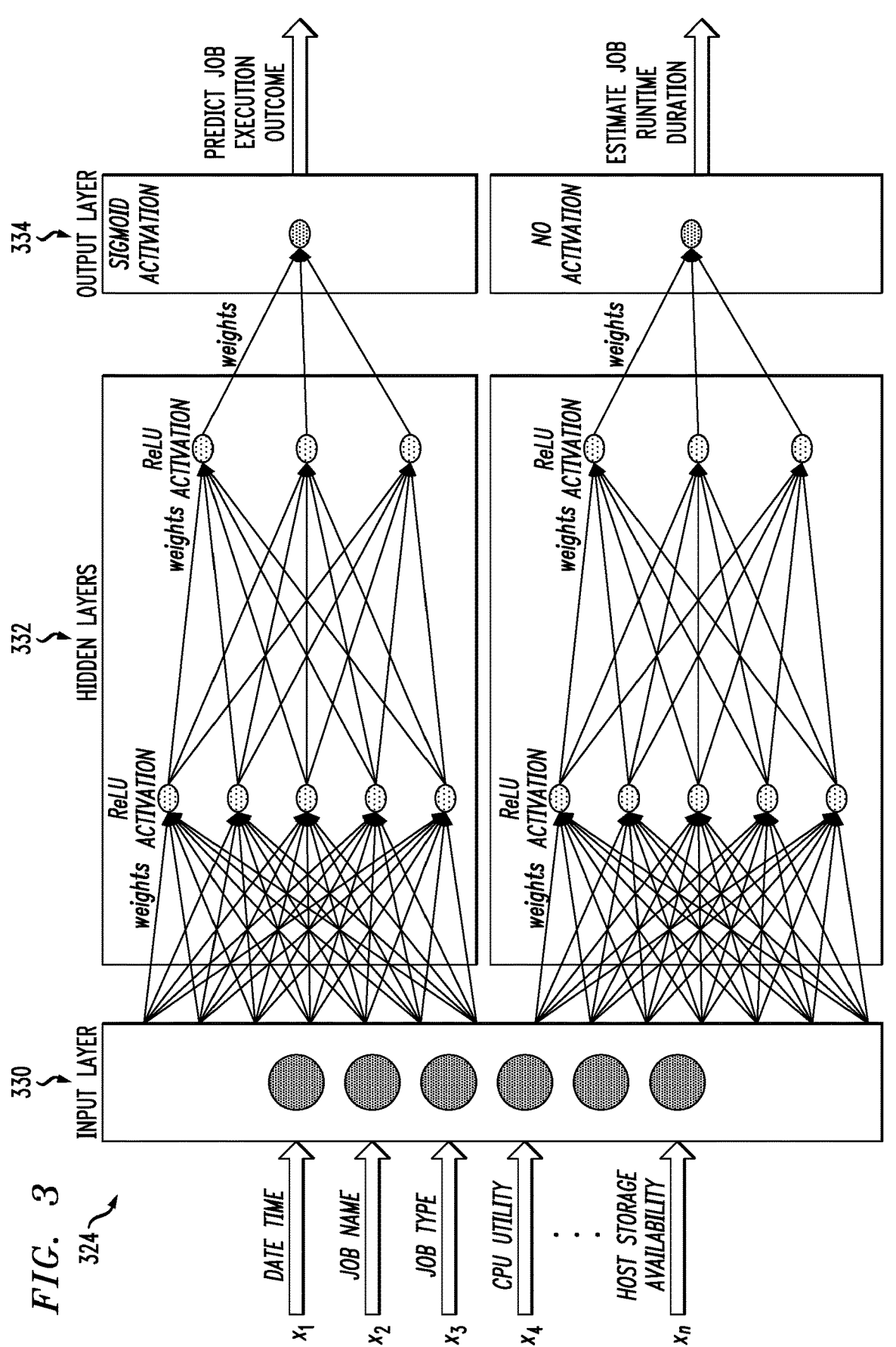
FIG. 3 shows example neural network architecture in an illustrative embodiment.

FIG. 3 shows example neural network architecture in an illustrative embodiment. Specifically, FIG. 3 depicts architecture of a deep neural network 324 (similar to deep neural network 224 depicted in FIG. 2), which comprises a multi-output neural network for batch job outcome predictions and job duration estimations. As illustrated in FIG. 3, deep neural network 324 includes an input layer 330, hidden layers 332 (including, for example, two hidden layers) and an output layer 334. As a multi-output neural network, deep neural network 324 creates two separate branches of network across the hidden layers 332 and output layer 334 that connect to the same input layer 330.

As depicted in FIG. 3, input layer 330 includes a number of neurons that matches the number of input and/or independent variables such as, for example, date-time information $(x_1)$, job name $(x_2)$, job type $(x_3)$, CPU utilization $(x_4)$, host storage availability $(x_n)$, etc. The hidden layers 332 of deep neural network 324 includes two layers, and the number of neurons on each layer depends upon the number of neurons in the input layer 330. The output layer 334 for each branch of deep neural network 324 can contain different numbers of neurons, due, for example, to the type of output associated therewith. That said, in the example architecture depicted in FIG. 3, both branches of the output layer 334 use just one neuron in each branch. For example, in the classifier branch that will predict the success of batch job execution, there is one neuron at the output layer 334 with a sigmoid activation function, while in the regressor branch that will estimate the duration of job runtime, there is one neuron at the output layer 334, but no activation function. As also depicted in FIG. 3, the neurons in the hidden layers 332 use a rectified linear unit (ReLU) activation function for both branches. Additionally, as depicted in FIG. 3, the connections between neurons in the input layer 330 and the hidden layers 332 include one or more weights.

In connection with one or more machine learning algorithms (e.g., regressions and neural networks), weight components and bias components are commonly used. For example, in neural networks, a weight can be multiplied with the input and a bias can be added to calculate the output value of a neuron. In one or more embodiments, both the weight value(s) and the bias value(s) are set at a random value, and when a computation is carried out, the given value gets calculated in the forward propagation (e.g., from left to right) and is compared with the actual value (which is the target value in the training data). The difference between the actual value and the predicted value is referred to as the error, and the neural network attempts to minimize that error. One way which a neural network attempts to achieve that is by back propagation (e.g., moving from right to left) and changing the value of the weight value(s) and the bias value(s) via a method referred to as gradient descent. By doing so multiple times (wherein each time is referred to an epoch), the optimal value of the weight value(s) and the bias value(s) are set, resulting in a predicted value that is close to the actual value.

As further detailed in connection with FIG. 4 through FIG. 9, the implementation of an artificial intelligence-based job outcome prediction and job duration estimation engine can be achieved, for example, using Keras with Tensorflow backend, Python language, Pandas, Numpy and ScikitLearn libraries.

FIG. 4 shows example pseudocode for data preprocessing in an illustrative embodiment. In this embodiment, example pseudocode 400 is executed by or under the control of at least one processing system and/or device. For example, the example pseudocode 400 may be viewed as comprising a portion of a software implementation of at least part of automated batch job processing system 105 of the FIG. 1 embodiment.

The example pseudocode 400 illustrates importing libraries, reading datasets of historical batch job execution data files and generating a Pandas data frame, which contains columns of various independent variables and both of the dependent/target variable columns (i.e., job execution outcome and job runtime duration estimation). In one or more embodiments, data preprocessing can also include handling any null or missing values in the columns, which can include, for example, replaying null or missing values in numerical columns by the median value of that column. Additionally, after performing initial data analysis by creating one or more univariate and bivariate plots of the columns, the importance and/or influence of each column (on the dependent/target variable) can be determined and/or estimated. Columns that have no or limited influence on the dependent/target variable can be removed.

It is to be appreciated that this particular example pseudocode shows just one example implementation of data preprocessing, and alternative implementations can be used in other embodiments.

FIG. 5 shows example pseudocode for encoding categorical values in an illustrative embodiment. In this embodiment, example pseudocode 500 is executed by or under the control of at least one processing system and/or device. For example, the example pseudocode 500 may be viewed as comprising a portion of a software implementation of at least part of automated batch job processing system 105 of the FIG. 1 embodiment.

The example pseudocode 500 illustrates encoding textual and/or categorical values into numerical values (which can then be processed by machine learning models, as detailed herein). For example, categorical values such job name, job type, historical job outcome, etc. are encoded using, as depicted in example pseudocode 500, LabelEncoder from a ScikitLearn library.

It is to be appreciated that this particular example pseudocode shows just one example implementation of encoding categorical values, and alternative implementations can be used in other embodiments.

FIG. 6 shows example pseudocode for splitting a dataset into training and testing sets in an illustrative embodiment. In this embodiment, example pseudocode 600 is executed by or under the control of at least one processing system and/or device. For example, the example pseudocode 600 may be viewed as comprising a portion of a software implementation of at least part of automated batch job processing system 105 of the FIG. 1 embodiment.

The example pseudocode 600 illustrates splitting a dataset into training and testing datasets using a train_test_split function of a ScikitLearn library with 70%-30% split (i.e., splitting 70% of the initial dataset to a training dataset and 30% of the initial dataset to a testing dataset). Because one or more embodiments include implementation of a multi-target prediction model, such an embodiment includes separating both target variables from the initial dataset.

It is to be appreciated that this particular example pseudocode shows just one example implementation of splitting a dataset into training and testing sets, and alternative implementations can be used in other embodiments.

FIG. 7 shows example pseudocode for creating a neural network in an illustrative embodiment. In this embodiment, example pseudocode 700 is executed by or under the control of at least one processing system and/or device. For example, the example pseudocode 700 may be viewed as comprising a portion of a software implementation of at least part of automated batch job processing system 105 of the FIG. 1 embodiment.

The example pseudocode 700 illustrates creating a multi-layer, multi-output capable dense neural network using a Keras library. Specifically, the neural network is built using a Keras functional model, as separate branches can be created and added to the functional model. Two separate dense layers are added to the input layer, with each network capable of predicting different targets (e.g., job outcome and job duration).

It is to be appreciated that this particular example pseudocode shows just one example implementation of creating a neural network, and alternative implementations can be used in other embodiments.

Figure 8:
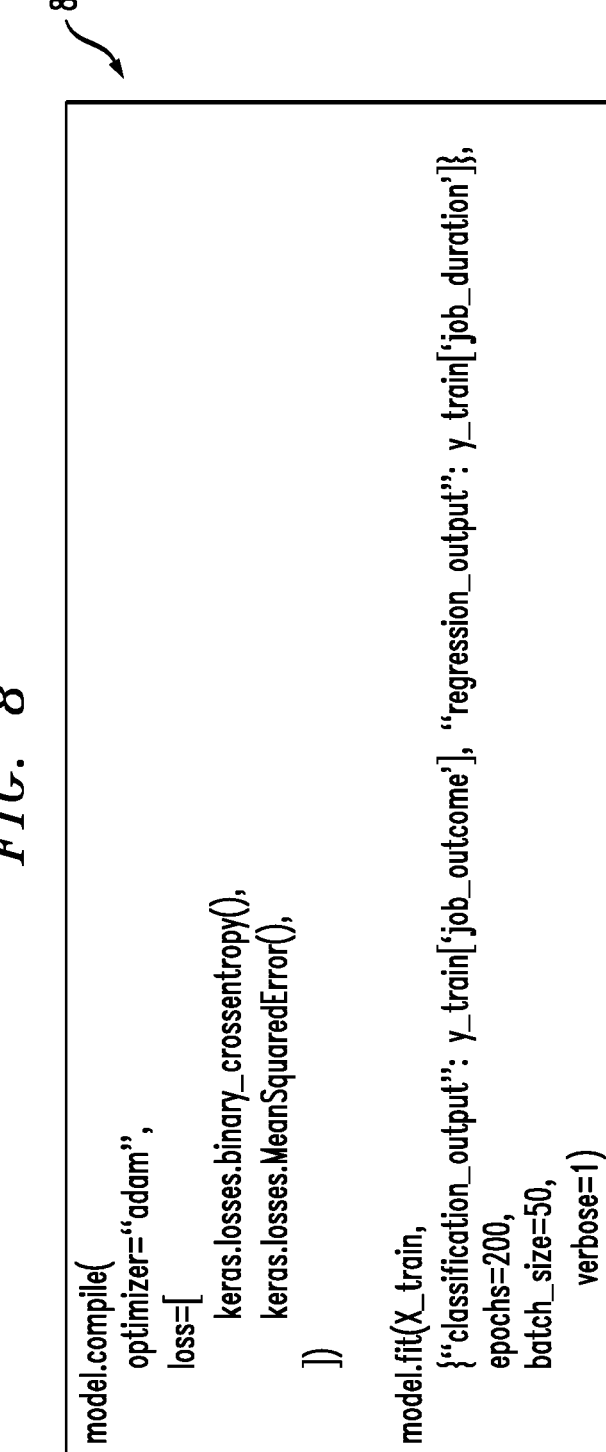
FIG. 8 shows example pseudocode for compiling and training the neural network in an illustrative embodiment.

FIG. 8 shows example pseudocode for compiling and training the neural network in an illustrative embodiment. In this embodiment, example pseudocode 800 is executed by or under the control of at least one processing system and/or device. For example, the example pseudocode 800 may be viewed as comprising a portion of a software implementation of at least part of automated batch job processing system 105 of the FIG. 1 embodiment.

The example pseudocode 800 illustrates using the Adam algorithm as the optimizer and binary_crossentropy as the loss function for the binary classification branch, while using mean squared error as the loss function for the regression branch. Additionally, the model is trained using independent variables data (X_train) and the target variables are passed for each path (i.e., classification and regression).

It is to be appreciated that this particular example pseudocode shows just one example implementation of compiling and training the neural network, and alternative implementations can be used in other embodiments.

Figure 9:
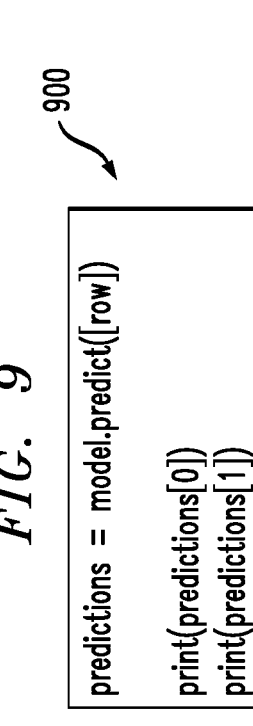
FIG. 9 shows example pseudocode for generating a prediction using the neural network in an illustrative embodiment.

FIG. 9 shows example pseudocode for generating a prediction using the neural network in an illustrative embodiment. In this embodiment, example pseudocode 900 is executed by or under the control of at least one processing system and/or device. For example, the example pseudocode 900 may be viewed as comprising a portion of a software implementation of at least part of automated batch job processing system 105 of the FIG. 1 embodiment.

The example pseudocode 900 illustrates predicting, once the model is trained, both target variable values by passing independent variable values to the predict( ) function of the model.

It is to be appreciated that this particular example pseudo-code shows just one example implementation of generating a prediction using the neural network, and alternative implementations can be used in other embodiments.

It is to be appreciated that some embodiments described herein utilize one or more artificial intelligence models. It is to be appreciated that the term "model," as used herein, is intended to be broadly construed and may comprise, for example, a set of executable instructions for generating computer-implemented predictions. For example, one or more of the models described herein may be trained to generate predictions based on historic job execution data as well as various job-related resource utilization data, and such predictions can be used to initiate one or more automated actions (e.g., automatically scheduling one or more batch jobs, automatically executing at least a portion of one or more batch jobs at one or more given times, etc.).

FIG. 10 is a flow diagram of a process for automatically processing batch jobs in cloud environments using artificial intelligence techniques in an illustrative embodiment. It is to be understood that this particular process is only an example, and additional or alternative processes can be carried out in other embodiments.

In this embodiment, the process includes steps 1000 through 1006. These steps are assumed to be performed by automated batch job processing system 105 utilizing elements 112, 114 and 116.

Step 1000 includes obtaining historical job execution-related data for one or more previous batch jobs in at least one cloud environment and resource utilization-related data for one or more pending batch jobs in the at least one cloud environment. In at least one embodiment, obtaining historical job execution-related data includes obtaining one or more of data pertaining to historical job execution outcomes and data pertaining to processing time data of one or more types of jobs. Additionally, obtaining utilization-related data for one or more pending batch jobs can include obtaining one or more of central processing unit data, memory data, storage utilization data, input-output information, host infrastructure availability information, information pertaining to at least one of load, volume, and seasonality, date and time information, and job name information.

Step 1002 includes predicting one or more execution outcomes for the one or more pending batch jobs in the at least one cloud environment by processing at least a portion of the historical job execution-related data and at least a portion of the resource utilization-related data using one or more artificial intelligence techniques. In one or more embodiments, predicting one or more execution outcomes includes processing the at least a portion of the historical job execution-related data and the at least a portion of the resource utilization-related data using at least one deep neural network comprising multiple branches of network for multiple types of outputs, wherein a first of the multiple branches is associated with predicting the one or more execution outcomes for the one or more pending batch jobs. In such an embodiment, the first of the multiple branches of the at least one deep neural network includes a classifier.

Step 1004 includes estimating one or more temporal durations associated with executing the one or more pending batch jobs in the at least one cloud environment by processing the at least a portion of the historical job execution-related data and the at least a portion of the resource utilization-related data using the one or more artificial intelligence techniques. In at least one embodiment, estimating one or more temporal durations includes processing the at least a portion of the historical job execution-related data and the at least a portion of the resource utilization-related data using at least one deep neural network comprising multiple branches of network for multiple types of outputs, wherein a second of the multiple branches is associated with estimating the one or more temporal durations associated with executing the one or more pending batch jobs. In such an embodiment, the second of the multiple branches of the at least one deep neural network includes a regressor.

Step 1006 includes performing one or more automated actions based at least in part on the one or more predicted execution outcomes and the one or more estimated temporal durations. In one or more embodiments, performing one or more automated actions includes automatically scheduling at least a portion of the one or more pending batch jobs to be executed at one or more given times based at least in part on the one or more predicted execution outcomes and the one or more estimated temporal durations. Additionally or alternatively, performing one or more automated actions can include automatically executing at least a portion of one or more pending batch jobs at one or more given times based at least in part on the one or more predicted execution outcomes and the one or more estimated temporal durations. Also, in at least one embodiment, performing one or more automated actions includes automatically training at least a portion of the one or more artificial intelligence techniques based at least in part on feedback to one or more of the one or more predicted execution outcomes and the one or more estimated temporal durations.

Accordingly, the particular processing operations and other functionality described in conjunction with the flow diagram of FIG. 10 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically schedule batch jobs in cloud environments using artificial intelligence techniques. These and other embodiments can effectively overcome problems associated with application performance reductions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of system 100, these platforms may also be used to implement at least portions of other information processing systems in other embodiments.

Figures 11, 12:
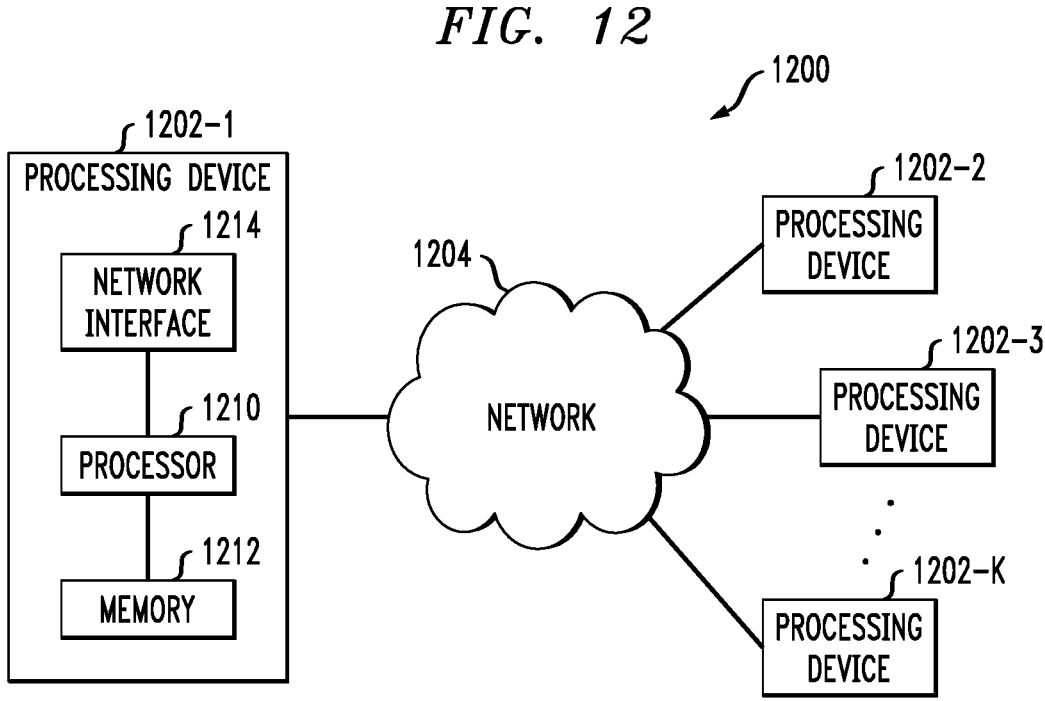
FIGS. 11 and 12 show examples of processing platforms that may be utilized to implement at least a portion of an information processing system in illustrative embodiments.

FIG. 11 shows an example processing platform comprising cloud infrastructure 1100. The cloud infrastructure 1100 comprises a combination of physical and virtual processing resources that are utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 comprise respective VMs, respective sets of one or more containers, or respective sets of one or more containers running in VMs. In some implementations of the FIG. 11 embodiment, the VMs/container sets 1102 comprise respective VMs implemented using virtualization infrastructure 1104 that comprises at least one hypervisor.

A hypervisor platform may be used to implement a hypervisor within the virtualization infrastructure 1104, wherein the hypervisor platform has an associated virtual infrastructure management system. The underlying physical machines comprise one or more information processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1202-1 in the processing platform 1200 comprises a processor 1210 coupled to a memory 1212.

The processor 1210 comprises a microprocessor, a CPU, a GPU, a TPU, a microcontroller, an ASIC, a FPGA or other type of processing circuitry, as well as portions or combinations of such circuitry elements.

The memory 1212 comprises random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining historical job execution-related data for one or more previous batch jobs in at least one cloud environment and resource utilization-related data for one or more pending batch jobs in the at least one cloud environment;

predicting one or more execution outcomes for the one or more pending batch jobs in the at least one cloud environment by processing at least a portion of the historical job execution-related data and at least a portion of the resource utilization-related data using at least one neural network comprising multiple network branches generating respective multiple outputs of different types, wherein a first of the multiple network branches comprises a classifier and is associated with predicting the one or more execution outcomes for the one or more pending batch jobs;

estimating one or more temporal durations associated with executing the one or more pending batch jobs in the at least one cloud environment by processing the at least a portion of the historical job execution-related data and the at least a portion of the resource utilization-related data using the at least one neural network comprising the multiple network branches, wherein a second of the multiple network branches comprises a regressor and is associated with estimating the one or more temporal durations associated with executing the one or more pending batch jobs in the at least one cloud environment, and wherein the first branch and the second branch share at least a portion of a common input layer that receives a common set of input data comprising the at least a portion of the historical job execution-related data and the at least a portion of the resource utilization-related data; and performing one or more automated actions based at least in part on the one or more predicted execution outcomes and the one or more estimated temporal durations;

wherein the method is performed by at least one processing device comprising a processor coupled to a memory.

2. The computer-implemented method of claim 1, wherein performing one or more automated actions comprises automatically scheduling at least a portion of the one or more pending batch jobs to be executed at one or more given times based at least in part on the one or more predicted execution outcomes and the one or more estimated temporal durations.

3. The computer-implemented method of claim 1, wherein performing one or more automated actions comprises automatically executing at least a portion of one or more pending batch jobs at one or more given times based at least in part on the one or more predicted execution outcomes and the one or more estimated temporal durations.

4. The computer-implemented method of claim 1, wherein performing one or more automated actions comprises automatically training at least a portion of the at least one neural network based at least in part on feedback to one or more of the one or more predicted execution outcomes and the one or more estimated temporal durations.

5. The computer-implemented method of claim 1, wherein obtaining historical job execution-related data comprises obtaining one or more of data pertaining to historical job execution outcomes and data pertaining to processing time data of one or more types of jobs.

6. The computer-implemented method of claim 1, wherein obtaining utilization-related data for one or more pending batch jobs comprises obtaining one or more of central processing unit data, memory data, storage utilization data, input-output information, host infrastructure availability information, information pertaining to at least one of load, volume, and seasonality, date and time information, and job name information.

7. A non-transitory processor-readable storage medium having stored therein program code of one or more software programs, wherein the program code when executed by at least one processing device causes the at least one processing device:

to obtain historical job execution-related data for one or more previous batch jobs in at least one cloud environment and resource utilization-related data for one or more pending batch jobs in the at least one cloud environment;

to predict one or more execution outcomes for the one or more pending batch jobs in the at least one cloud environment by processing at least a portion of the historical job execution-related data and at least a portion of the resource utilization-related data using at least one neural network comprising multiple network branches generating respective multiple outputs of different types, wherein a first of the multiple network branches comprises a classifier and is associated with predicting the one or more execution outcomes for the one or more pending batch jobs;

to estimate one or more temporal durations associated with executing the one or more pending batch jobs in the at least one cloud environment by processing the at least a portion of the historical job execution-related data and the at least a portion of the resource utilization-related data using the at least one neural network comprising the multiple network branches, wherein a second of the multiple network branches comprises a regressor and is associated with estimating the one or more temporal durations associated with executing the one or more pending batch jobs in the at least one cloud environment, and wherein the first branch and the second branch share at least a portion of a common input layer that receives a common set of input data comprising the at least a portion of the historical job execution-related data and the at least a portion of the resource utilization-related data; and to perform one or more automated actions based at least in part on the one or more predicted execution outcomes and the one or more estimated temporal durations.

8. The non-transitory processor-readable storage medium of claim 7, wherein performing one or more automated actions comprises automatically scheduling at least a portion of the one or more pending batch jobs to be executed at one or more given times based at least in part on the one or more predicted execution outcomes and the one or more estimated temporal durations.

9. The non-transitory processor-readable storage medium of claim 7, wherein performing one or more automated actions comprises automatically executing at least a portion of one or more pending batch jobs at one or more given times based at least in part on the one or more predicted execution outcomes and the one or more estimated temporal durations.

10. The non-transitory processor-readable storage medium of claim 7, wherein performing one or more automated actions comprises automatically training at least a portion of the at least one neural network based at least in part on feedback to one or more of the one or more predicted execution outcomes and the one or more estimated temporal durations.

11. The non-transitory processor-readable storage medium of claim 7, wherein obtaining historical job execution-related data comprises obtaining one or more of data pertaining to historical job execution outcomes and data pertaining to processing time data of one or more types of jobs.

12. The non-transitory processor-readable storage medium of claim 7, wherein obtaining utilization-related data for one or more pending batch jobs comprises obtaining one or more of central processing unit data, memory data, storage utilization data, input-output information, host infrastructure availability information, information pertaining to at least one of load, volume, and seasonality, date and time information, and job name information.

13. An apparatus comprising:

at least one processing device comprising a processor coupled to a memory;

the at least one processing device being configured:

to obtain historical job execution-related data for one or more previous batch jobs in at least one cloud environment and resource utilization-related data for one or more pending batch jobs in the at least one cloud environment;

to predict one or more execution outcomes for the one or more pending batch jobs in the at least one cloud environment by processing at least a portion of the historical job execution-related data and at least a portion of the resource utilization-related data using at least one neural network comprising multiple network branches generating respective multiple outputs of different types, wherein a first of the multiple network branches comprises a classifier and is associated with predicting the one or more execution outcomes for the one or more pending batch jobs;

to estimate one or more temporal durations associated with executing the one or more pending batch jobs in the at least one cloud environment by processing the at least a portion of the historical job execution-related data and the at least a portion of the resource utilization-related data using the at least one neural network comprising the multiple network branches, wherein a second of the multiple network branches comprises a regressor and is associated with estimating the one or more temporal durations associated with executing the one or more pending batch jobs in the at least one cloud environment, and wherein the first branch and the second branch share at least a portion of a common input layer that receives a common set of input data comprising the at least a portion of the historical job execution-related data and the at least a portion of the resource utilization-related data; and to perform one or more automated actions based at least in part on the one or more predicted execution outcomes and the one or more estimated temporal durations.

14. The apparatus of claim 13, wherein performing one or more automated actions comprises automatically scheduling at least a portion of the one or more pending batch jobs to be executed at one or more given times based at least in part on the one or more predicted execution outcomes and the one or more estimated temporal durations.

15. The apparatus of claim 13, wherein performing one or more automated actions comprises automatically executing at least a portion of one or more pending batch jobs at one or more given times based at least in part on the one or more predicted execution outcomes and the one or more estimated temporal durations.

16. The apparatus of claim 13, wherein performing one or more automated actions comprises automatically training at least a portion of the at least one neural network based at least in part on feedback to one or more of the one or more predicted execution outcomes and the one or more estimated temporal durations.

17. The apparatus of claim 13, wherein obtaining historical job execution-related data comprises obtaining one or more of data pertaining to historical job execution outcomes and data pertaining to processing time data of one or more types of jobs.

18. The apparatus of claim 13, wherein obtaining utilization-related data for one or more pending batch jobs comprises obtaining one or more of central processing unit data, memory data, storage utilization data, input-output information, host infrastructure availability information, information pertaining to at least one of load, volume, and seasonality, date and time information, and job name information.

* * * * *